United States Patent
Ilic et al.

(10) Patent No.: US 9,054,531 B2
(45) Date of Patent: Jun. 9, 2015

(54) GENERAL METHOD FOR DISTRIBUTED LINE FLOW COMPUTING WITH LOCAL COMMUNICATIONS IN MESHED ELECTRIC NETWORKS

(75) Inventors: Marija D. Ilic, Sudbury, MA (US); Andrew Hsu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 570 days.

(21) Appl. No.: 13/343,997

(22) Filed: Jan. 5, 2012

(65) Prior Publication Data
US 2013/0024168 A1   Jan. 24, 2013

Related U.S. Application Data

(60) Provisional application No. 61/572,623, filed on Jul. 19, 2011.

(51) Int. Cl.
  *G06G 7/54* (2006.01)
  *H02J 3/00* (2006.01)

(52) U.S. Cl.
  CPC ............. *H02J 3/00* (2013.01); *H02J 2003/007* (2013.01); *Y04S 40/22* (2013.01); *Y02E 60/76* (2013.01)

(58) Field of Classification Search
  CPC ....... Y04S 40/22; H02J 2003/001; H02J 3/00; G06F 5/00; Y02B 70/3225
  USPC .......................................................... 703/18
  See application file for complete search history.

(56) References Cited

U.S. PATENT DOCUMENTS

| | | | | |
|---|---|---|---|---|
| 5,566,085 A * | 10/1996 | Marceau et al. | ............... | 700/293 |
| 7,660,649 B1 * | 2/2010 | Hope et al. | ..................... | 700/295 |
| 2003/0200010 A1 * | 10/2003 | Chiang et al. | ................. | 700/286 |
| 2006/0229767 A1 * | 10/2006 | Chu et al. | ....................... | 700/286 |
| 2007/0027642 A1 * | 2/2007 | Chu et al. | ......................... | 702/60 |
| 2007/0203658 A1 * | 8/2007 | Patel | ................................. | 702/60 |
| 2007/0250217 A1 * | 10/2007 | Yoon et al. | ..................... | 700/286 |
| 2008/0103737 A1 * | 5/2008 | Yoon et al. | ......................... | 703/4 |
| 2009/0182518 A1 * | 7/2009 | Chu et al. | ......................... | 702/61 |
| 2009/0326882 A1 * | 12/2009 | Fang | .................................. | 703/2 |
| 2010/0114392 A1 * | 5/2010 | Lancaster | ...................... | 700/292 |
| 2011/0213606 A1 * | 9/2011 | Seaman et al. | ................... | 703/18 |

OTHER PUBLICATIONS

Andrey Pazderin, Sergey Yuferev, "Power Flow Optimization by Compination of Nweton-Raphson Method and Newton's Method in Optimization" IEEE 2009, 978-1-4244-4649, pp. 1693-1696.*

(Continued)

*Primary Examiner* — Dwin M Craig
(74) *Attorney, Agent, or Firm* — Withrow & Terranova, P.L.L.C.

(57) ABSTRACT

The present disclosure relates to distributed line flow processing for a network having nodes with branches coupling adjacent ones of the nodes and components coupled to the nodes. In one embodiment, the disclosed process includes receiving an objective function having component variables, nodal output variables and branch flow variables for the network. Next, the component variables, nodal output variables and branch flow variables are initialized with initial values, and then values for the branch flow variables are calculated using a distributed Newton method. Finally, values for the component variables and the nodal output variables are calculated using values calculated for the branch flow variables until the values of the component variables, the nodal output variables, and the branch flow variables converge within a predetermined threshold range.

29 Claims, 11 Drawing Sheets

(56) References Cited

OTHER PUBLICATIONS

Ermin Wei, Asuman Ozdaglar, Ali Jadbabaie, "A Distributed Newton Method for Network Utility Maximization", Apr. 25, 2011 Department of Electrical Engineering and Computer Science, Massachusetts Institute of Technology, 67 pages.*

Ng, W. Y., "Generalized generation distribution factors for power systems security evaluations," IEEE Transactions on Power Apparatus and Systems, Mar. 1981, pp. 1001-1005.

Ilic-Spong, et al., "Redistribution of reactive power flow in contingency studies," IEEE Transactions on Power Apparatus and Systems, PWRS-1, Aug. 1986, pp. 266-275.

General Agreement on Parallel Paths Experiments (GAPP), Final Report, Aug. 1999, 35 pages.

Jadbabaie, A., "A distributed Newton method for optimization," Proceedings of the 48th IEEE Conference on Decision and Control, Dec. 2009, pp. 2736-2741.

Boyd, S. et al., "Convex Optimization," Cambridge University Press, UK, 2004, 730 pages.

Donsion, M.P., "UPFC (Unified Power Flow Controller," Universidad de Vigo, Spain, Aug. 24, 2007, 17 pages.

Becker, S., "Convex Optimization: A light-speed introduction," Applied and Computational Mathematics California Institute of Technology, Oct. 23, 2009, 66 pages.

Wei, Ermin et al., "A Distributed Newton Method for Network Utility Maximization," Proceedings of the 49th IEEE Conference on Decision and Control, Dec. 15-17, 2010, Atlanta, Georgia, 8 pages.

* cited by examiner

GENERAL METHOD FOR DISTRIBUTED LINE FLOW COMPUTING WITH LOCAL COMMUNICATIONS IN MESHED ELECTRIC NETWORKS

RELATED APPLICATIONS

This application claims the benefit of provisional patent application Ser. No. 61/572,623, filed Jul. 19, 2011, the disclosure of which is hereby incorporated herein by reference in its entirety.

FIELD OF THE DISCLOSURE

The present disclosure relates to a method and system for computing electrical mesh networks locally and autonomously.

BACKGROUND

Much has changed since the electric energy industry has introduced distribution factors-based methods for monitoring line flows in large electric energy grids. The industry currently lacks sharing of information between different utilities and control areas. As a consequence, often the least expensive and cleanest resources cannot be scheduled to avoid possible transmission line flow congestion due to lack of such information exchange. Moreover, much industry effort has gone toward tracking different power transactions in order to ensure that these do not create thermal line flow overloads, in particular, namely to ensure no (N−1) security problems. An electrical power system is N−1 secure if any single component in the electrical power system can fail without affecting service to the consumers for at least thirty minutes following the component failure. The hybrid approach to regulated transmission and competitive generation has created many financial distortions as well. Nevertheless, short of any other known way of ensuring most efficient utilization of transmission assets for enabling efficient energy resource utilization, transmission owners build assets, system operators dispatch power around the anticipated transmission congestion limitations and the congestion cost is not directly used to give incentives for reducing congestion in the future.

As these and similar problems continue to create operating and planning problems, very little rethinking of the overall approach to monitoring and managing transmission system congestion has been done. As a result, it has become practically impossible to reconcile the use of sensors and controllers of the individual equipment with the objectives of operating and planning an electrical power system according to the coarse scalar measures such as (N−1) security objectives. Many developers of high technologies with a potential for enhancing effectiveness of future power grid operations currently provide ready-to-use and cost-effective sensors, communications and decision tools with large computing power at the equipment level. The ultimate vision of micro-grids as almost entirely autonomous self-adjusting networks enabling utilization of many small distributed energy resources and meeting diverse energy needs of consumers has remained a remote dream given the wide gap between the methods used to monitor and manage resources and the methods which could be used to take advantage of smart distributed sensors and controllers.

Today's industry typically uses tools, such as distribution factors, to make adjustments to the system. The distribution factors measure how sensitive changes in each line's flow are to changes in each injection at the buses of the system. When generation is to be adjusted at individual buses, the change in each line flow can be inferred using the distribution factors, to check if line flows will violate line constraints, such as physical or thermal limits.

The power injections to the buses denoted here as vector $P_g$, and the phase angles at the nodes denoted as vector θ, then are related as follows:

$$P_g = B'\theta, \quad (1)$$

where B' is a full susceptance matrix of the system. Since one nodal phase angle will be dependent on other nodal phase angles, the full susceptance matrix will be a singular matrix. The full susceptance matrix usually has the first row removed since a first node corresponds to a slack bus. The first column of the full susceptance matrix is removed as well.

On the other hand, the relationship between the nodal angles θ and the line flows $P_f$ can be written as $$P_f = DA\theta, \quad (2)$$

where D is a diagonal matrix whose diagonal elements are the negative of the susceptance of a line corresponding to an associated branch. The matrix A is the line-node incidence matrix. In combining the equation (1) and the equation (2), a relationship between $P_f$ and $P_g$ is expressed as $$P_f = DAB'^{-1}P_g. \quad (3)$$

Equation (3) shows the sensitivity of $P_f$ to $P_g$ for a given network, and it is routinely used by the industry to relate incremental changes in line flows created by the incremental changes in power injections. A matrix that relates $P_f$ to $P_g$ is often referred to as the distribution factors matrix.

Network operators will need to know the entire A matrix as well as to invert the full susceptance matrix in order to perform a distribution factor calculation. Then, if thermal line flow constraints are violated, the network operators will need to adjust injections until the line constraints are no longer violated.

SUMMARY

The present disclosure relates to distributed line flow processing for a network having nodes with branches coupling adjacent ones of the nodes and components coupled to the nodes. In one embodiment, the processing includes receiving an objective function having component variables, nodal output variables, and branch flow variables for the network. Next, the component variables, nodal output variables and branch flow variables are initialized with initial values, and then values for the branch flow variables are calculated using a distributed Newton method. Finally, values for the component variables and the nodal output variables are calculated using values calculated for the branch flow variables until the values of the component variables, the nodal output variables, and the branch flow variables converge within a predetermined threshold range.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 13:
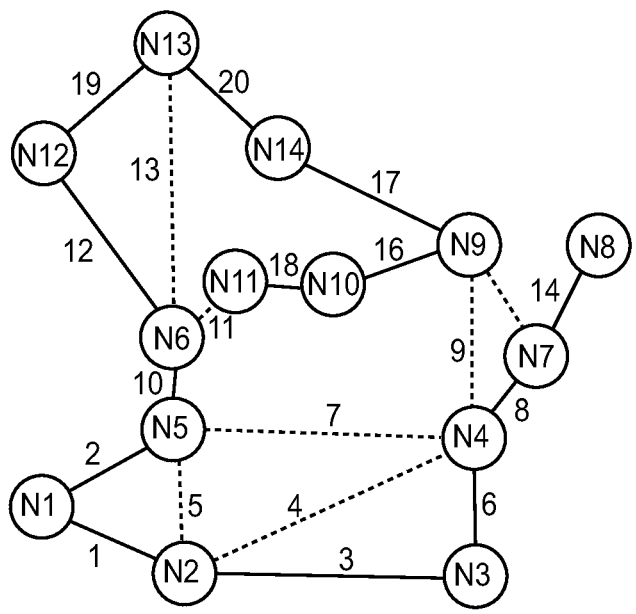
FIG. 13 is a line diagram of an Institute of Electrical and Electronics Engineers (IEEE) fourteen bus system that can be monitored via the distributed line flow computing method and system of the present disclosure.
Figure 14:
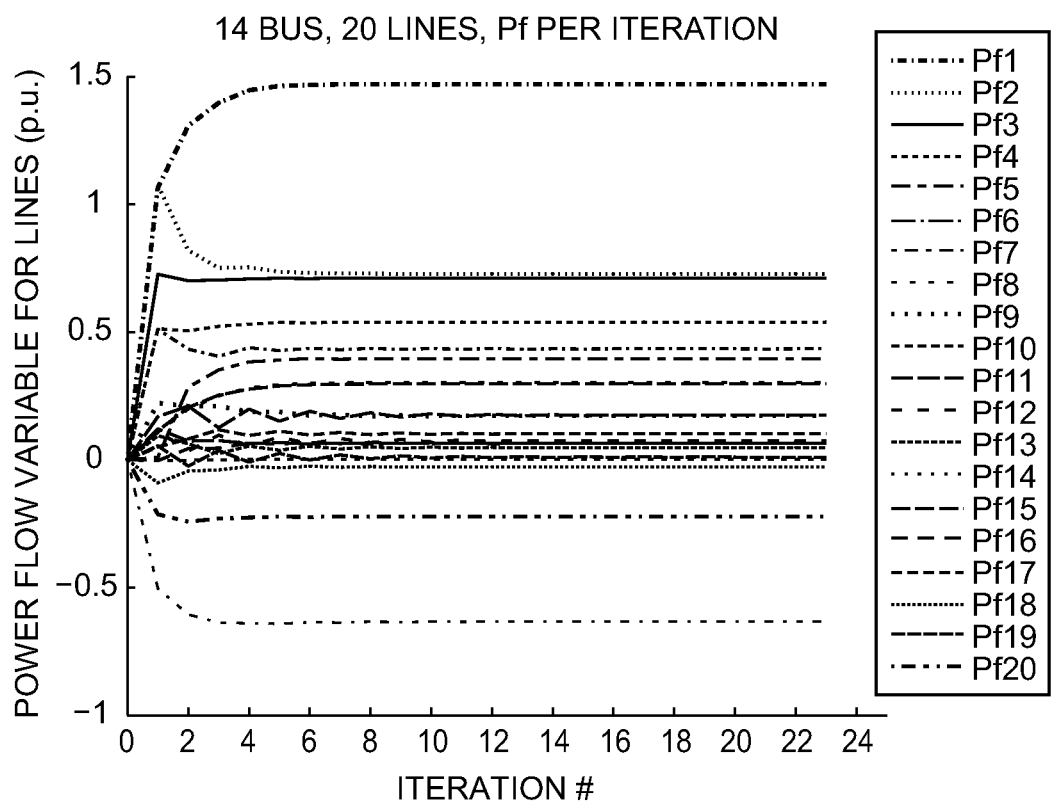

FIG. 14 a graph of power flow ($P_f$) that satisfies Kirchhoff's current law (KCL) versus iterations for a simulation of the IEEE fourteen bus system of FIG. 13 using distributed line flow computing according to the present disclosure.

Figure 15:
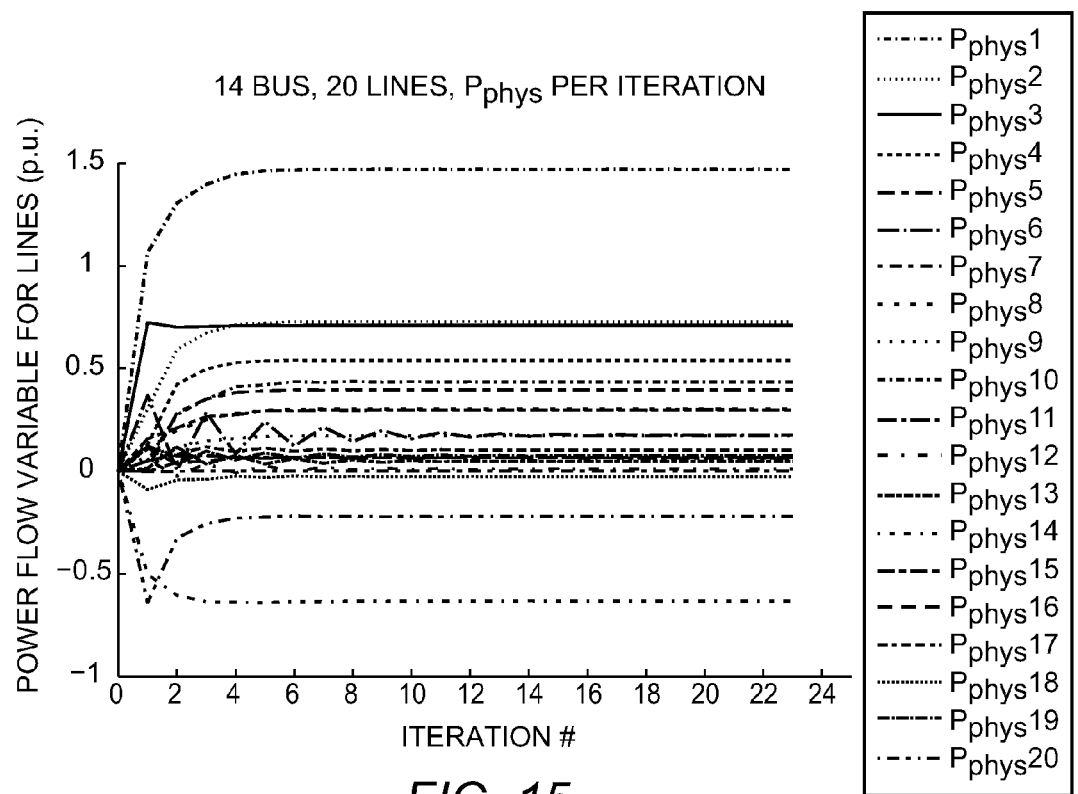

FIG. 15 is a graph of power flow ($P_{phys}$) that satisfies Kirchhoff's voltage law (KVL) and Ohm's law versus iterations for a simulation of the IEEE fourteen bus system of FIG. 13 for two example cases using distributed line flow computing according to the present disclosure.

Figure 16:
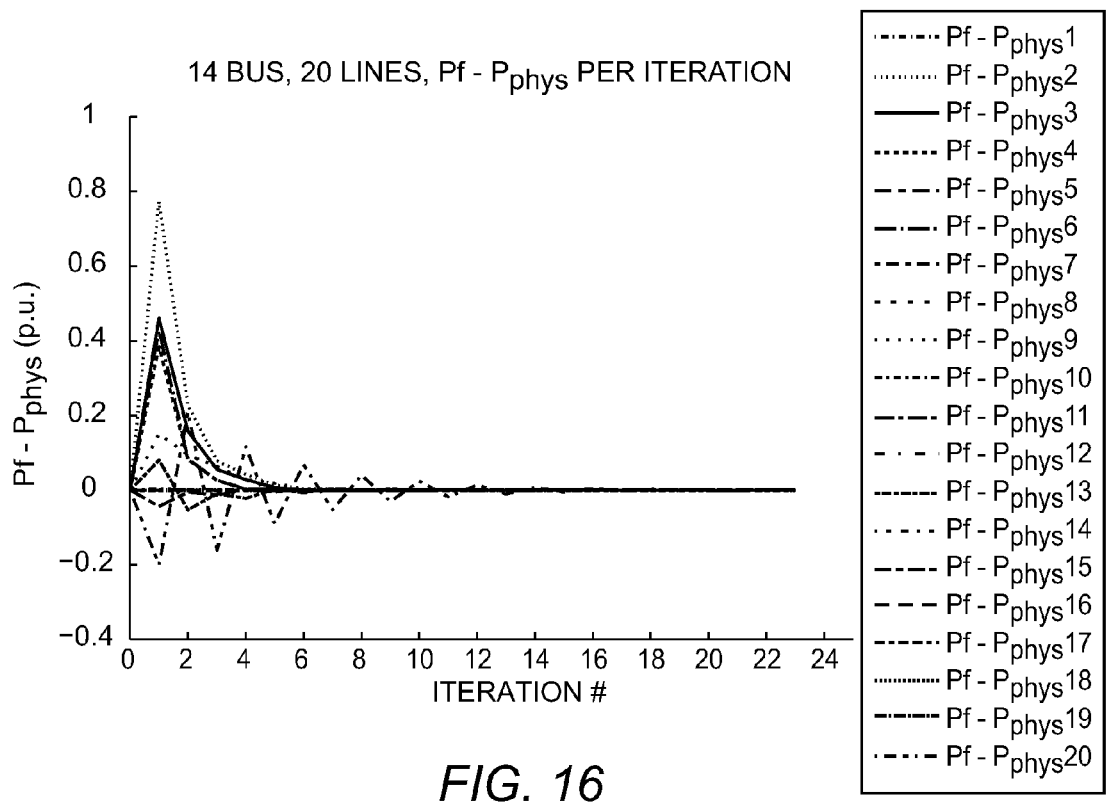

FIG. 16 is a graph of power flow ($P_{phys}$-$P_f$) versus iterations for a simulation of the IEEE fourteen bus system of FIG. 13 for two example cases using distributed line flow computing according to the present disclosure.

Figure 17:
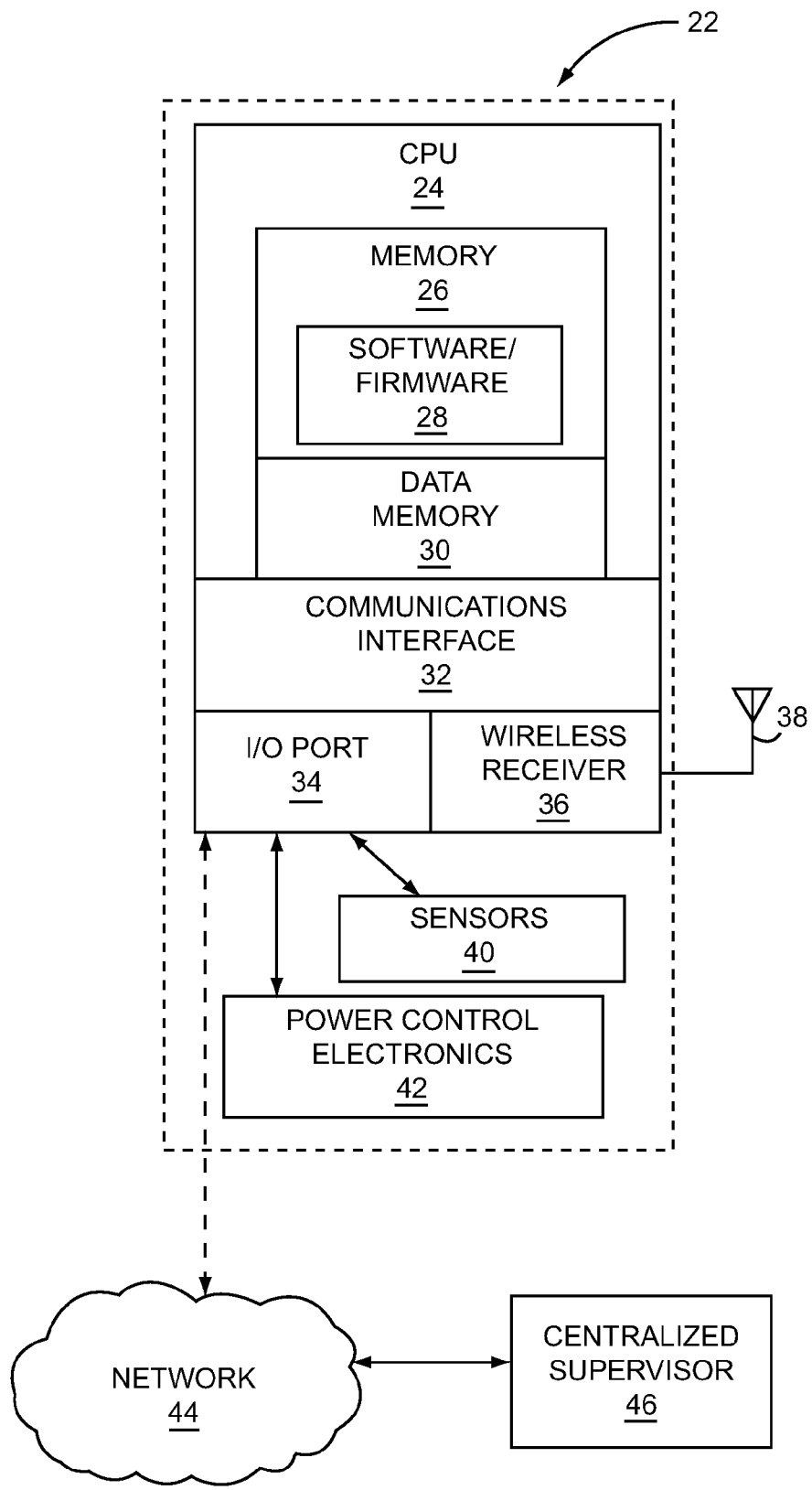

FIG. 17 is a block diagram of a line flow calculator device for executing the distributed line flow computing method in accordance with the present disclosure.

Figure 18:
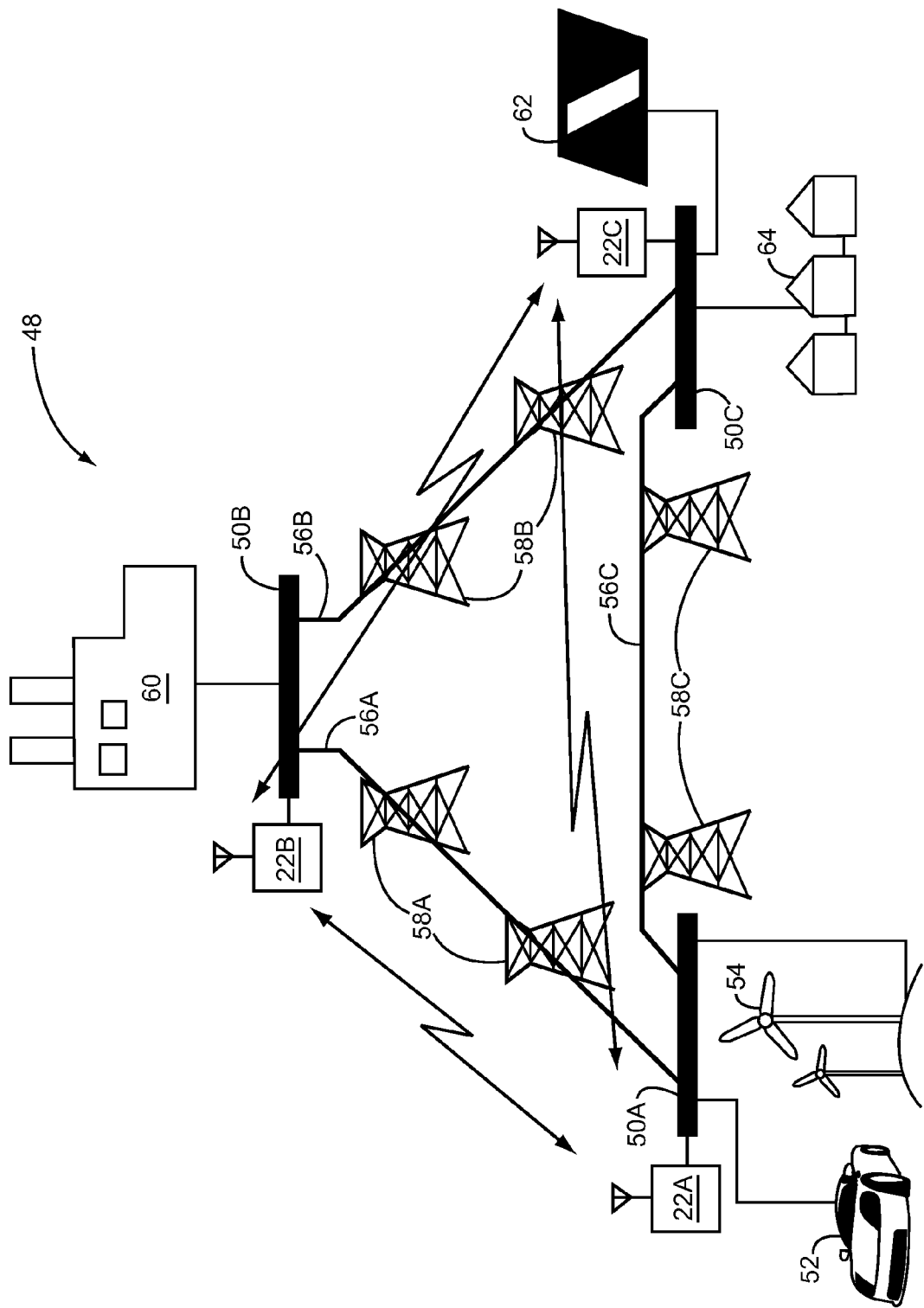

FIG. 18 is a simplified diagram of an electrical utility network that incorporates line flow calculators that are usable to implement the distributed line flow computing method and system of the present disclosure.

Figure 19:
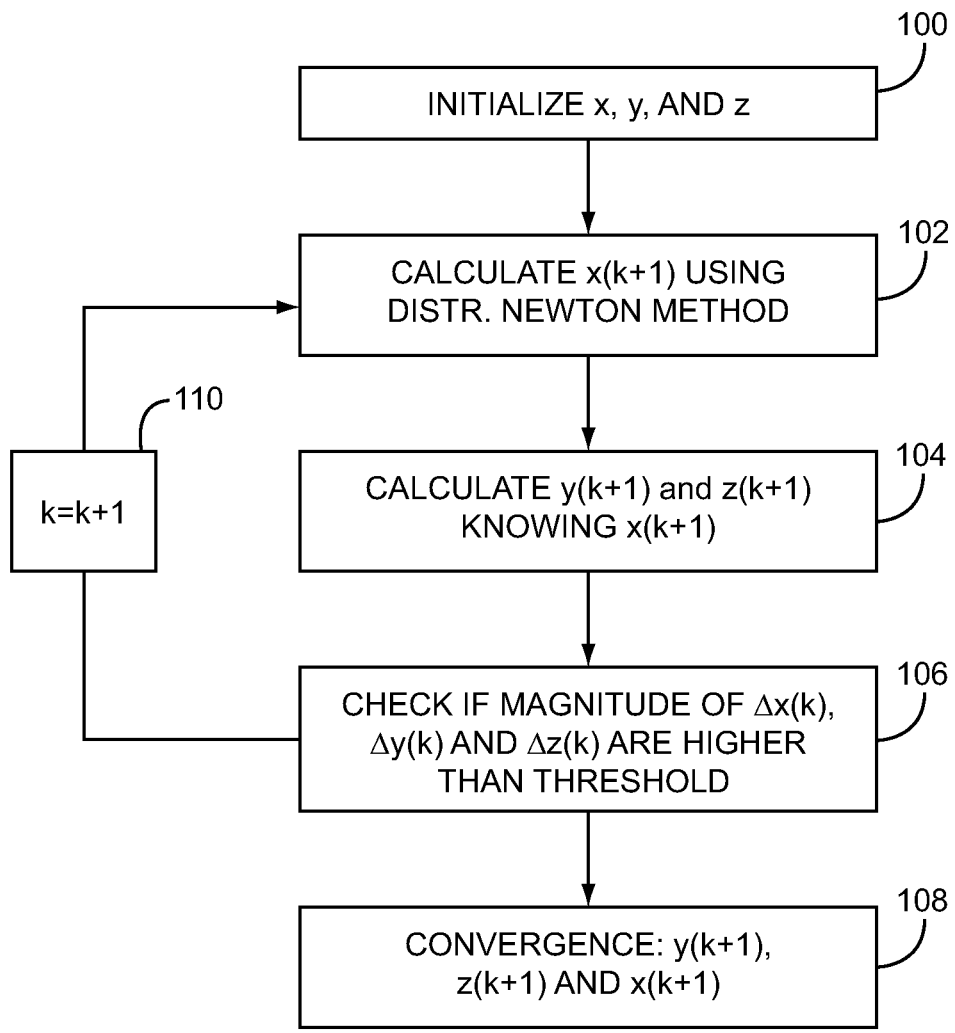

FIG. 19 is a flow chart illustrating the general operation of the distributed line flow computing method of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

A method and system disclosed herein for distributed line flow computing is applicable for solving various network optimization problems. For example, the method and system is applicable to transportation type networks wherein typically an equivalent of Kirchhoff's current law (KCL) must be satisfied. Unlike electric power systems, transportation networks have no equivalent of physical laws such as Ohm's law, nor network constraints reflecting Kirchhoff's voltage law (KVL).

When applied to electric power systems, the present method and system must take electric power-specific conditions into account. The following description poses the problem of distributed line flow calculations as a distributed network optimization problem. A solution that reflects the physical characteristics of specific lines is obtained by appropriately posing the optimization objective.

A. Problem Setup $P_f$: vector of power flows through lines between nodes, satisfying KCL, $P_{phys}$: vector of power flows through lines between nodes, satisfying KVL and Ohm's law, b: vector of injections leaving/entering the nodes $P_g$, A: incidence matrix, N×B (node to branch), $A_{ij}$: 1 if branch j leaves node i}, $A_{ij}$: −1 if branch j enters node i}, and $X_e$: reactance of line e.

B. Proposed Objective Function for an Electric Energy Network

For the method to be distributed, the chosen objective function should be in the form:

$$f(x) = \sum_{e=1}^{E} \phi_e(x_e), \tag{4}$$

where x represents the vector of all line flows, $x_e$ to be optimized.

For the case of electric energy networks, x is defined as the vector of all the power line flows, $P_{f,e}$'s, one for every line in the network. In order to satisfy all the constraints of the electric energy network, i.e., KCL, KVL, and Ohm's law, the objective function is chosen to minimize the difference between $P_f$ and $P_{phys}$. Recall that $P_f$ is calculated subject to KCL and that $P_{phys}$ is calculated subject to KVL and Ohm's law. The new optimization function is:

$$f(x) = \sum_{e=1}^{E}(P_{f,e} - P_{phys,e})^2. \quad (5)$$

In this optimization function, $P_{phys}$ would be updated between iterations via the phase angle difference between the ends of each line, so that it satisfies Ohm's law. Optimality conditions for the objection function chosen will ensure that $P_f$ and $P_{phys}$ align.

C. KCL Constraints $$Ax = AP_f = b \quad (6)$$

Constraints are defined by the network graph. A, x, and b are defined above, and Equation (6) defines their relationship on the graph of the network. Each line calculates and stores its own flow ($P_{f,e}$) and receives the information about injections, ($b_i$), from nodes i to which they are connected. The A matrix is constant for a given topography and defines which injections are connected to which lines.

D. Distributed Line Flow Computing as a Distributed Newton Optimization Method

The Equality-Constrained Newton Method uses a Second Order Approximation of objective function $f(P_f)$ in Equation (5), resulting in the form:

$$\hat{f}(P_f + v) = f(P_f) \nabla f(P_f)^T v + (1/2) v^T \nabla^2 f(P_f) v \quad (7)$$

$$s.t. A(P_f + v) = b. \quad (8)$$

If the Lagrangian is written in terms variables v and w, the following algebraic relationship can be formed:

$$\nabla f(P_f) + \nabla^2 f(P_f) v + A^T w = 0. \quad (9)$$

Variable v represents the deviations of $P_f$ from the solution and w the nodal power mismatch from the solution.

$P_f$ is solved by creating iteration steps using equation 10:

$$P_{f,k+1} = P_{fk} + v_k \quad (10)$$

The variables $v_k$ and $w_k$ can be solved using equation (9) to yield:

$$v_k = -H_k^{-1}(\nabla f(P_f) + A^T w_k), \quad (11)$$

$$(AH_k^{-1}A^T)w_k = h_k - AH_k^{-1}\nabla f(P_f). \quad (12)$$

where:

$$H_k = \nabla^2 f(P_f), \quad (13)$$

$$h_k = AP_f - b. \quad (14)$$

The variable $w_k$ can be solved for using the Jacobi Method. This formulation recognizes that $AH_k^{-1}A^T$ is a weighted Laplacian of the graph, and that each diagonal is the negative sum of the off-diagonal terms in the row, while the off-diagonal terms equal $\Delta^2 f(P_{f_{i,j}})$ if nodes i and j are connected, and zero if they are not. This matrix can be separated into diagonal and off-diagonal terms.

Next, in order to set up the equations for the Jacobi method, the following equations are rearranged:

$$AH_k^{-1}A^T = D_k - B_k, \quad (15)$$

$$h_k - AH_k^{-1}\nabla f(x) = s_k, \quad (16)$$

$$(D_k - B_k)w_k = s_k, \quad (17)$$

$$(D_k + I - B_k - I)w_k = s_k, \quad (18)$$

$$(I - (D_k + I)^{-1}(B_k + I))w_k = (D_k + I)^{-1}s_k. \quad (19)$$

This creates a Jacobi Method Iteration:

$$w_k(t+1) = (D_k + I)^{-1}(B_k + I)w_k(t) + (D_k + I)^{-1}s_k(t). \quad (20)$$

After Wk is solved, it can be substituted into the equation (11) for $v_k$. Then $P_{fk+1} = P_{fk} \pm v_k$ can be iterated.

Once $P_{fk+1}$ is calculated, δ and $P_{phys}$ can be updated before the next iteration. To update δ, a Newton step is used. First the function g(δ) is defined as:

$$g_e(\delta_e) = \frac{1}{X_e}\sin(\delta_e) - P_{f,e}, \quad (21)$$

for each line e. This represents a mismatch between the network variable, $P_{f,e}$ and the physical angle δ. The Newton step is taken as an iteration step:

$$\delta_{e,k+1} = \delta_{e,k} + \frac{g_e(\delta_e)}{g'_e(\delta_e)}P_{phys,k+1} = \frac{1}{X_e}\sin(\delta_{e,k+1}), \quad (22)$$

where $g'_e(\delta_e)$ the derivative of $g_e(\delta_e)$ with respect to $\delta_e$. However, it is critical to observe that in a meshed electric energy network, because of Kirchhoff's voltage law, only (N−1) phase angles, $\delta_e$, are independent, where N is the total number of buses, or nodes, in the graph of the network. These can be determined with graph theory techniques, such as creating a normal tree in the graph. The remaining (E−N+1) phase angles are dependent on the first (N−1), where E is the total number of lines, or branches. Within a closed loop of the graph, the phase angle differences must add up to zero, so algebraic relationships for the dependent phase angles can be written in terms of independent ones.

The algebraic relationship between independent and dependent variables can be obtained by using the matrix relationship between nodal phase angles and phase angle differences. The vector of phase angle differences, δ, can be divided into those from a constructed normal tree, $\delta_{nt}$, which are independent, and the other (E−N+1) angles, which can be called $\delta_{nt}^-$. The variable δ can be expressed in terms of nodal phase angles, θ, using the incidence matrix δ, as:

$$\delta = \begin{bmatrix} \delta_{nt} \\ \delta_{nt}^- \end{bmatrix} = A\theta. \quad (23)$$

The incidence matrix, A, can have its rows divided to correspond to the independent and dependent angles, $A_{nt}$, and $A_{nt}^-$, resulting in two submatrices, of which the one corresponding to the normal tree angles is square, having the dimensions (N−1)×(N−1). This can be rewritten as:

$$\begin{bmatrix} \delta_{nt} \\ \delta_{nt}^- \end{bmatrix} = \begin{bmatrix} A_{nt} \\ A_{nt}^- \end{bmatrix}\theta. \quad (24)$$

The top rows, corresponding to the normal tree, can be written in terms of θ, $$\theta = A_{nt}^{-1}\delta_{nt}, \quad (25)$$

can then be taken and substituted into the equation of the bottom rows, $$\delta_{nt}^- = A_{nt}^-\theta = A_{nt}^-A_{nt}^{-1}\delta_{nt}, \quad (26)$$

creating a relationship between the dependent and independent variables.

After these steps, the algorithm checks if the Newton steps have converged, by checking the absolute values of $v_k$ and $$\frac{g_e(\delta_e)}{g'_e}$$

for every line. If they are below a predetermined threshold, then the algorithm converges, and stops. If they are above the predetermined threshold, then the algorithm iterates to the next step, calculating a new Newton step for the network variables $P_f$.

Implementing the distributed algorithm will take place by both the lines and nodes of the network. The distributed Newton method is designed to allow each row of $P_f$ to be updated independently of other rows once certain criterias are met. Firstly, the objective function must be written as a summation of sub-functions which are only a function of one of the flow variables, as shown in equation (4). This leads to the Hessian matrix, $\nabla^2 f(P_f)$, to be a diagonal matrix. This is notable because, in solving for $v_k$, the inverse of the Hessian must be taken. If the Hessian is a diagonal matrix, the inverse will also be diagonal, allowing each row to be calculated using terms local to the line.

When calculating the $w_k$, diagonalization is also important. In the formulation of the Jacobi iterations, equation (11) separates the susceptance matrix into diagonal and off-diagonal components. Only the diagonal matrix $(D_k+I)$ is inverted when the Jacobi iteration steps are set up using equation (16). Thus, row by row, $w_k$ is independent by nodes. When substituted into the equation $v_k$, it is multiplied by $A^T$, which maps nodes back to lines. This keeps the algorithm distributed with respect to lines, given that they can exchange information to nodes that they are connected to.

The communication between components can be summarized as follows: Each line has a guess for its line flow. It then calculates its $\nabla f(P_f)$ and $\nabla^2 f(P_f)$ locally, using equation (5). In order to calculate $w_k$, equation (12) is used. It can then exchange that information with the nodes it is connected to. The nodes must wait for all lines to which they are connected to give them their local information in order to calculate $w_k$, while knowing their own injections. The variable $w_k$ is then sent back to the lines connected to that node, which allows each line to calculate $v_k$, and thus update $P_f$. Each line can then update its own $\delta$ and $P_{phys}$ variables. Computing devices local to the lines and nodes can be programmed at minimum computing cost, and can use existing or planned communications infrastructure.

Figure 1:
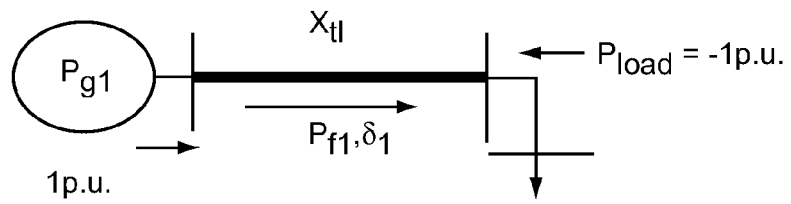
FIG. 1 is a single-line diagram depicting a simple two-bus power network.

Simulations have been run for three different small system configurations. The two node system represents the case for which calculations can be easily double checked, the three node two line system represents a small radial network, and the three node three line case represents a small mesh network. The expected values were calculated using the distribution factors method. The two-bus system is represented in FIG. 1. A single transmission line $X_{tl}$ is represented by a thick dark line, which indicates that $X_{tl}$ having a power flow $P_{f1}$ and a phase angle $\delta_1$ that must be updated. The transmission line couples a generator $P_{g1}$ that provides 1 p.u. to a load $P_{load}$ wad that absorbs −1 p.u.

The two bus system is the simplest possible electrical network. It consists of a generator, a load, and a transmission line. The system can be described as such:

$$P_f = [P_{f1}], \quad (27)$$

$$A = \begin{bmatrix} 1 \\ -1 \end{bmatrix}, \quad (28)$$

$$b = \begin{bmatrix} 1 \\ -1 \end{bmatrix}, \quad (29)$$

Simulations were done using several initial conditions. Due to space constraints only two cases are shown. The threshold for convergence in simulations was 0.001. The reactance of the transmission line was 0.1 p.u. The initial values were chosen as a random value from a uniform distribution between 0 p.u. and 1.5 p.u. which is within the expected range of the power flows.

TABLE 1

$P_{f1}$ FOR A SIMPLE TWO BUS NETWORK SYSTEM
Calculated Versus Expected Variable $P_{f1}$

| Case | $P_{f1 init.}$ | $P_{f1 fin.}$ | $P_{f1 exp.}$ | Iter. |
|---|---|---|---|---|
| 1 | 1.030872 | 1.000460 | 1.0 | 2 |
| 2 | 0.791570 | 0.999814 | 1.0 | 2 |

Figure 2:
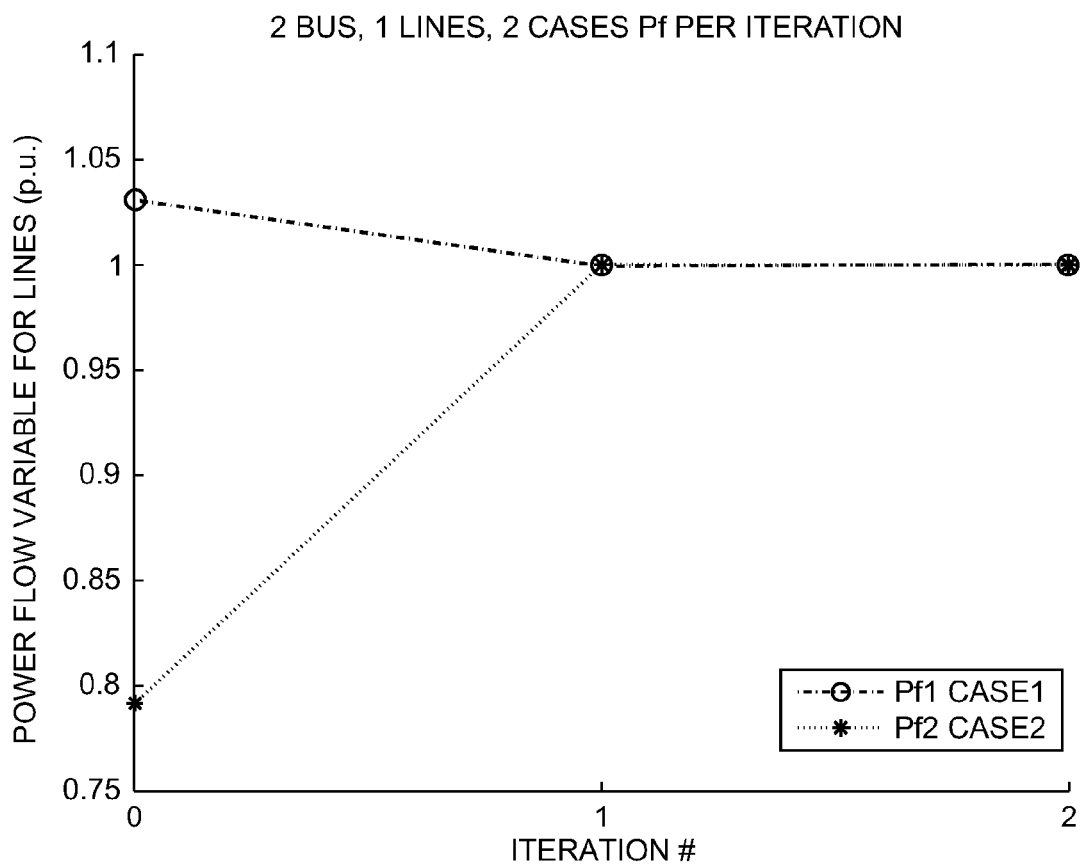
FIG. 2 is a graph of power flow ($P_f$) that satisfies Kirchhoff's current law (KCL) versus iterations for a simulation of the simple two-bus power network of FIG. 1 using distributed line flow computing according to the present disclosure.

FIG. 2 is a graph of power flow ($P_f$) that satisfies Kirchhoff's current law (KCL) versus iterations for a simulation of the simple two-bus power network of FIG. 1 using distributed line flow computing according to the present disclosure. In particular, the graph of FIG. 2 illustrates how each variable changes between iterations before convergence.

Figure 3:
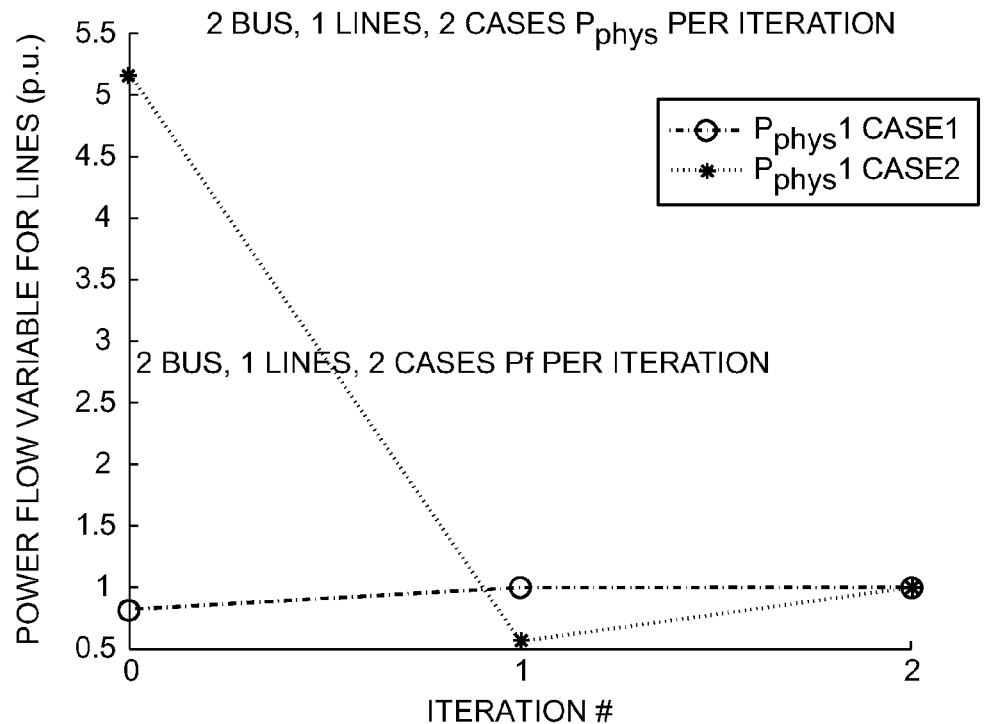
FIG. 3 is a graph of power flow ($P_{phys}$) that satisfies Kirchhoff's voltage law (KVL) and Ohm's law versus iterations for a simulation of the simple two-bus power network of FIG. 1 for two example cases using distributed line flow computing according to the present disclosure.
Figure 4:
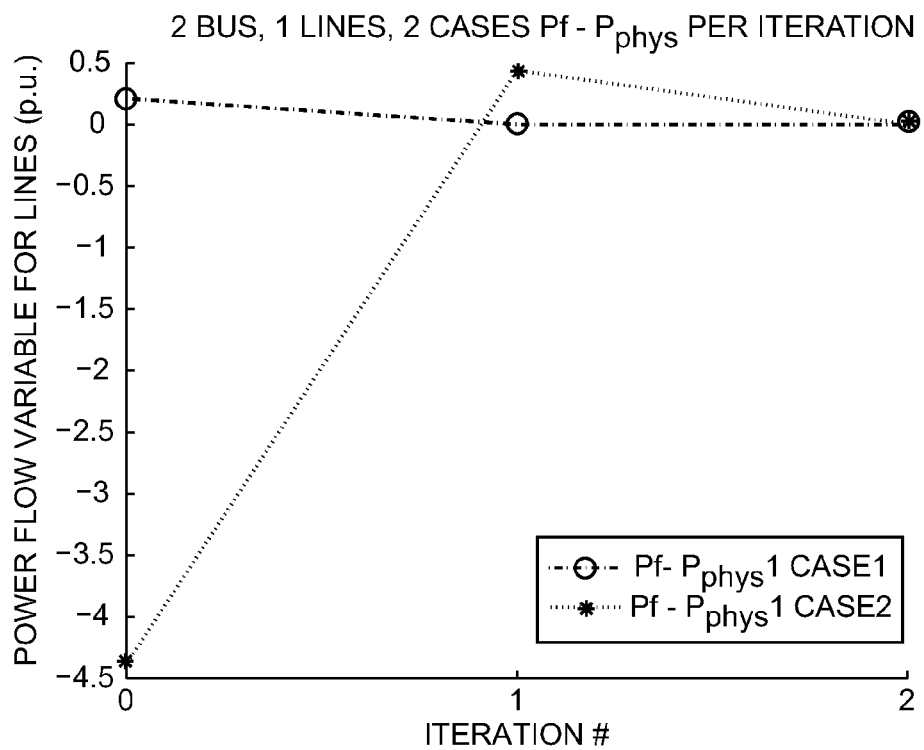
FIG. 4 is a graph of power flow ($P_{phys}$-$P_f$) versus iterations for a simulation of the simple two-bus power network of FIG. 1 for two example cases using distributed line flow computing according to the present disclosure.

FIG. 3 is a graph of power flow ($P_{phys}$) that satisfies Kirchhoff's voltage law (KVL) and Ohm's law versus iterations for a simulation of the simple two-bus power network of FIG. 1 for two example cases using distributed line flow computing according to the present disclosure. The iteration results of $P_f$ and $P_{phys}$ can be found in FIG. 2 to FIG. 4. This shows how each variable changed in between iterations, before converging. The difference between $P_f$ and $P_{phys}$ was also plotted to show that they become equal upon convergence as shown in FIG. 4. That indicates that the variable being optimized, $P_f$, approaches the power flow corresponding with the phase angle of the line, $P_{phys}$, which is iterated separately. Additionally, the differences between the expected and calculated values are very close, two to three orders of magnitude smaller than 1 p.u. This compares the solution found by conventional methods, such as distribution factors, to the final solution of the algorithm. The proposed algorithm took two iterations to complete for both sets of initial conditions chosen for this system configuration.

Figure 5:
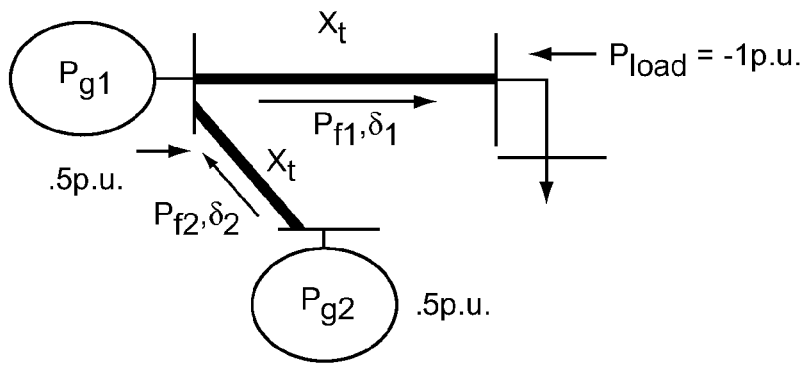
FIG. 5 is a single-line diagram depicting a simple radial power network.

FIG. 5 is a single-line diagram depicting a simple radial power network wherein there are no loops formed by the lines. Electric energy distribution networks tend to be radial networks. Similarly to the two bus case, the $P_f$ and $P_{phys}$ values are shown to converge, and be very close to the expected values. The A matrix and b vector reflect the fact that there are only two lines but three nodes, and the load is placed at one of the ends of the radial network. The other two nodes have generators, both producing 0.5 p.u. Transmission lines are depicted as thick black lines, because their phase angles are independent. This is the case in radial networks, which have no loops, thus creating no algebraic constraints on the phase angles.

$$P_f = \begin{bmatrix} P_{f1} \\ P_{f2} \end{bmatrix}, \quad (30)$$

$$A = \begin{bmatrix} 1 & -1 \\ 0 & -1 \\ -1 & 0 \end{bmatrix}, \quad (31)$$

$$b = \begin{bmatrix} 0.5 \\ 0.5 \\ -1 \end{bmatrix}. \quad (32)$$

$$P_f = \begin{bmatrix} P_{f1} \\ P_{f2} \\ P_{f3} \end{bmatrix}, \quad (33)$$

$$A = \begin{bmatrix} 1 & -1 & 0 \\ 0 & 1 & -1 \\ -1 & 0 & 1 \end{bmatrix}, \quad (34)$$

$$b = \begin{bmatrix} 0.5 \\ 0.5 \\ -1 \end{bmatrix}. \quad (35)$$

TABLE 2

$P_{f1}$ FOR A SIMPLE RADIAL NETWORK SYSTEM
Calculated Versus Expected Variable $P_{f1}$

| Case | $P_{f1\ init.}$ | $P_{f1\ fin.}$ | $P_{f1\ exp.}$ | Iter. |
|---|---|---|---|---|
| 1 | 0.9326 | 1.0028 | 1.0 | 4 |
| 2 | 0.5594 | 0.9998 | 1.0 | 6 |

TABLE 3

$P_{f2}$ FOR A SIMPLE RADIAL NETWORK SYSTEM
Calculated Versus Expected Variable $P_{f2}$

| Case | $P_{f2\ init.}$ | $P_{f2\ fin.}$ | $P_{f2\ exp.}$ |
|---|---|---|---|
| 1 | 1.1554 | 0.4971 | 0.5 |
| 2 | 0.8158 | 0.4971 | 0.5 |

Figure 6:
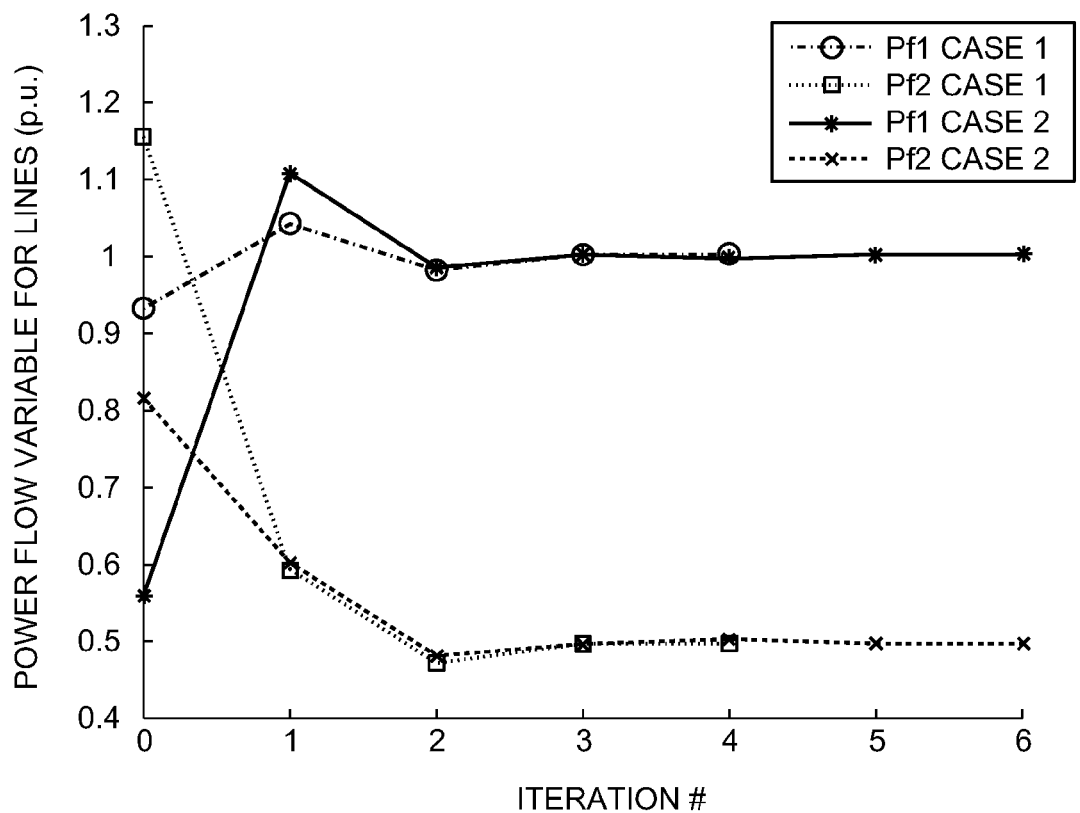
FIG. 6 is a graph of power flow ($P_f$) that satisfies Kirchhoff's current law (KCL) versus iterations for a simulation of the simple radial power network of FIG. 5 using distributed line flow computing according to the present disclosure.
Figure 7:
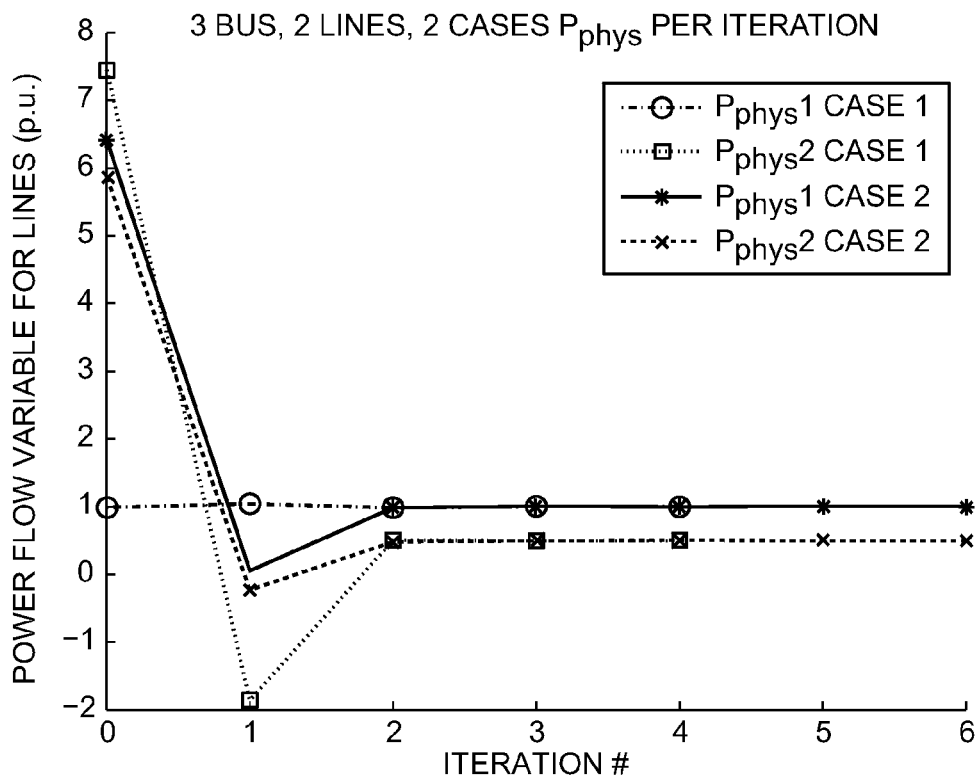
FIG. 7 is a graph of power flow ($P_{phys}$) that satisfies Kirchhoff's voltage law (KVL) and Ohm's law versus iterations for a simulation of the simple radial power network of FIG. 5 for two example cases using distributed line flow computing according to the present disclosure.

FIG. 6 is a graph of power flow ($P_f$) that satisfies Kirchhoff's current law (KCL) versus iterations for a simulation of the simple radial power network of FIG. 5 using distributed line flow computing according to the present disclosure. FIG. 7 is a graph of power flow ($P_{phys}$) that satisfies Kirchhoff's voltage law (KVL) and Ohm's law versus iterations for a simulation of the simple radial power network of FIG. 5 for two example cases using distributed line flow computing according to the present disclosure. The $P_{f1}$ and $P_{f2}$ both converge to be very close to the expected value, within 0.003 p.u. of the expected values. FIG. 6 and FIG. 7 show the convergence of $P_{f1}$ and $P_{f2}$, respectively, for both cases of initial conditions. The initial conditions take four to six iterations, as opposed to two iterations for the two bus system.

Figure 8:
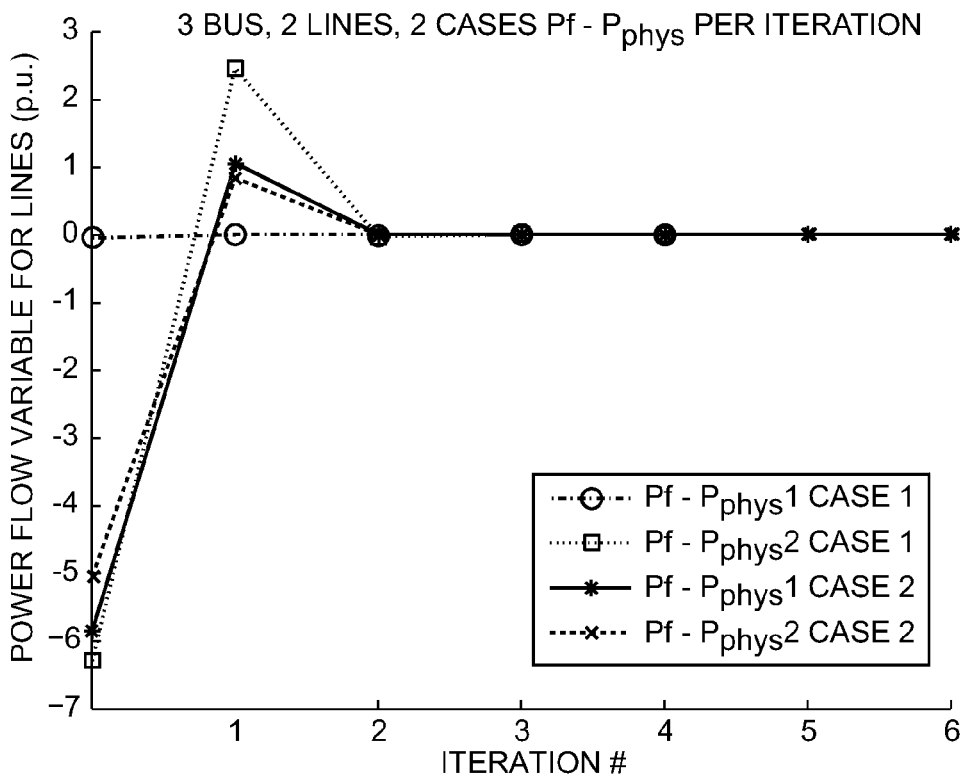
FIG. 8 is a graph of power flow ($P_{phys}$-$P_f$) versus iterations for a simulation of the simple radial power network of FIG. 5 for two example cases using distributed line flow computing according to the present disclosure.
Figure 9:
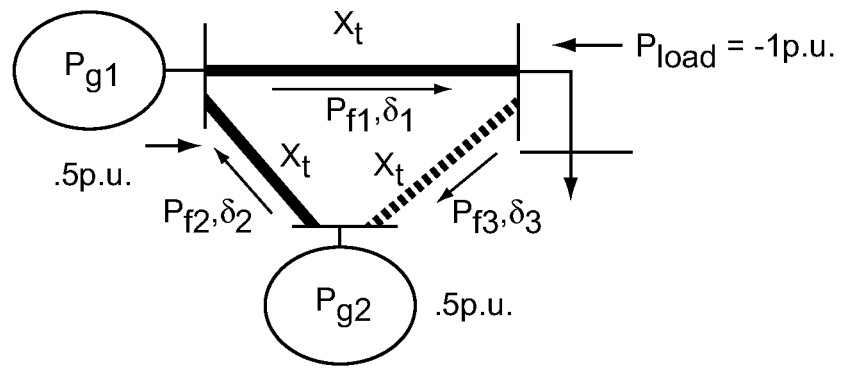
FIG. 9 is a single-line diagram depicting a simple mesh power network.

FIG. 8 is a graph of power flow ($P_{phys}$-$P_f$) versus iterations for a simulation of the simple radial power network of FIG. 5 for two example cases using distributed line flow computing according to the present disclosure. The graph of FIG. 8 shows that the variables $P_f$ and $P_{phys}$ eventually converge. A mesh network is a network which has loops created by the lines. Transmission networks are typically meshed and are harder to solve for than radial networks. The generators of the buses give the same injection values as the case of the simple radial network. However, this example contains an additional transmission line, which changes the A matrix. FIG. 9 is a single-line diagram depicting a simple mesh power network. In the simulations, the third transmission line, represented by dashed line, must have its phase angle updated according to KVL, which relates to the phase angles of the other two lines, represented by thick black lines. The KVL constraint is applied after the independent transmission lines have updated their own phase angle, but before the next iteration loop of $P_f$ in the network. The necessary variables are defined as follows:

TABLE 4

$P_{f1}$ FOR A SIMPLE MESH NETWORK SYSTEM
Calculated Versus Expected Variable $P_{f1}$

| Case | $P_{f1\ init.}$ | $P_{f1\ fin.}$ | $P_{f1\ exp.}$ | Iter. |
|---|---|---|---|---|
| 1 | 1.261426 | 0.500000 | 0.5 | 5 |
| 2 | 1.192532 | 0.500018 | 0.5 | 6 |

TABLE 5

$P_{f2}$ FOR A SIMPLE MESH NETWORK SYSTEM
Calculated Versus Expected Variable $P_{f2}$

| Case | $P_{f2\ init.}$ | $P_{f2\ fin.}$ | $P_{f2\ exp.}$ |
|---|---|---|---|
| 1 | 1.131070 | -0.000000 | 0 |
| 2 | 1.056670 | 0.000481 | 0 |

TABLE 6

$P_{f3}$ FOR A SIMPLE MESH NETWORK SYSTEM
Calculated Versus Expected Variable $P_{f3}$

| Case | $P_{f3\ init.}$ | $P_{f3\ fin.}$ | $P_{f3\ exp.}$ |
|---|---|---|---|
| 1 | 0.589892 | -0.500000 | -0.5 |
| 2 | 0.896521 | -0.500499 | -0.5 |

Figure 10:
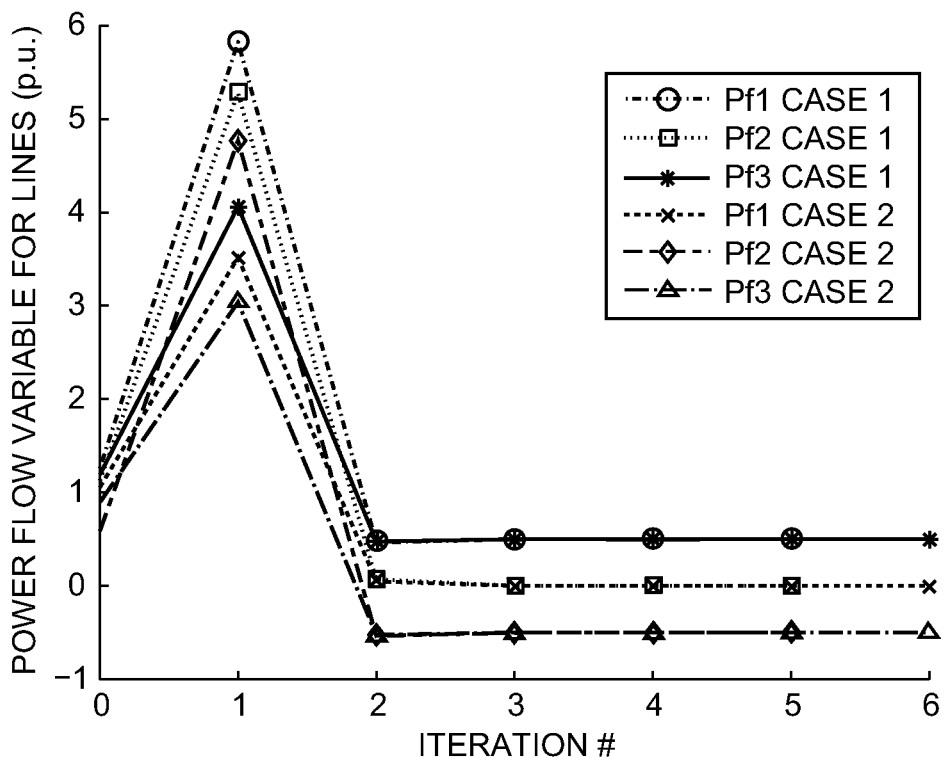
FIG. 10 is a graph of power flow ($P_f$) that satisfies Kirchhoff's current law (KCL) versus iterations for a simulation of the simple mesh power network of FIG. 9 using distributed line flow computing according to the present disclosure.
Figure 11:
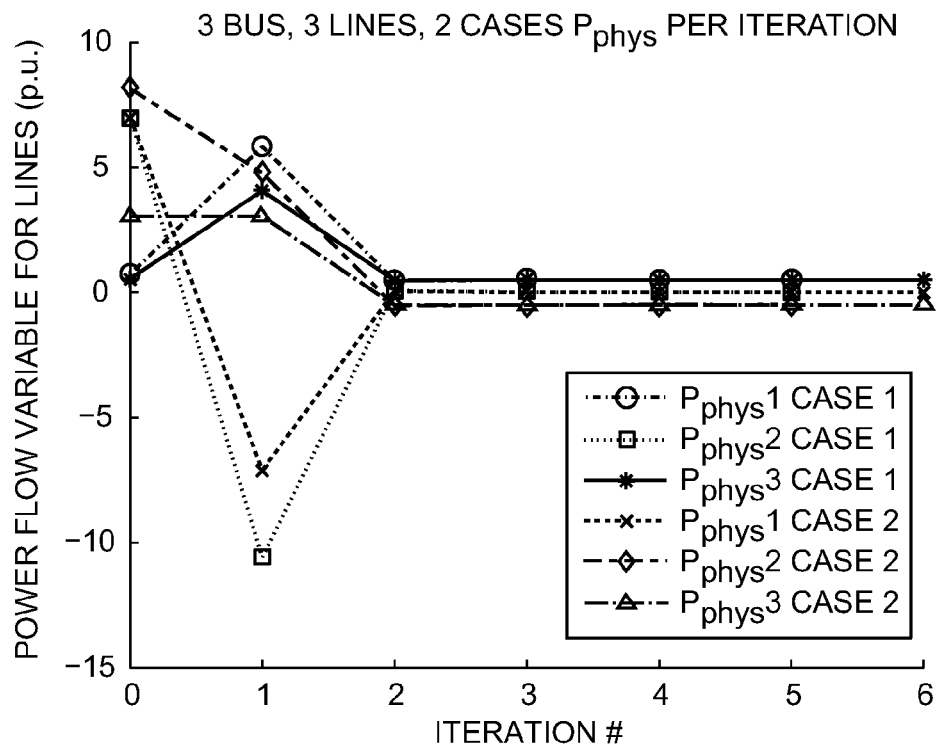
FIG. 11 is a graph of power flow ($P_{phys}$) that satisfies Kirchhoff's voltage law (KVL) and Ohm's law versus iterations for a simulation of the simple mesh power network of FIG. 9 for two example cases using distributed line flow computing according to the present disclosure.
Figure 12:
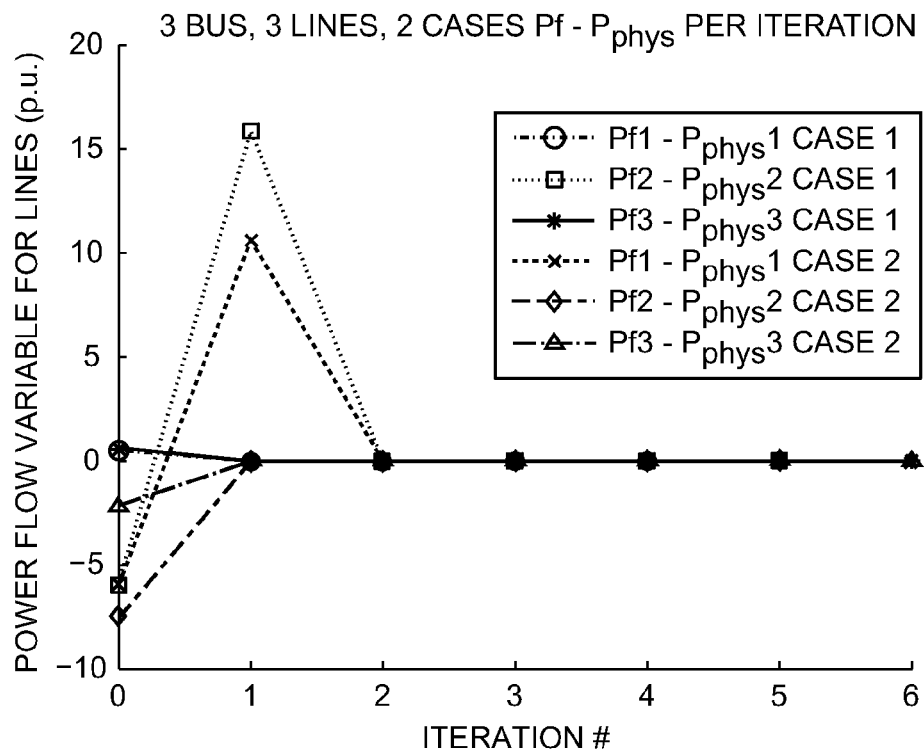
FIG. 12 is a graph of power flow ($P_{phys}$-$P_f$) versus iterations for a simulation of the simple mesh power network of FIG. 9 for two example cases using distributed line flow computing according to the present disclosure.

The iterations of two sets of initial conditions are plotted in FIG. 10 to FIG. 12. There are three line flows, and they each converge to their own corresponding value. This case is interesting because one of the flows, $P_{f2}$, ends up being zero, because on either side of the line the flows being sent are equal to each other, and cancelling out. This can be verified by doing the example with only one generation and half the load at a time, and then applying superposition to both sub-examples. As in the simple radial network example, the algorithm usually converges in around six iterations. The deviation from the expected value is also within the 0.003 range. The simulation results of these three simple configurations show that this algorithm can be used to solve for DC power flow in systems such as these, with given bus injections and line reactances. In particular, FIG. 10 is a graph of power flow ($P_f$) that satisfies Kirchhoff's current law (KCL) versus iterations for a simulation of the simple mesh power network of FIG. 9 using distributed line flow computing according to the present disclosure.

FIG. 11 is a graph of power flow ($P_{phys}$) that satisfies Kirchhoff's voltage law (KVL) and Ohm's law versus iterations for a simulation of the simple mesh power network of FIG. 9. Two example cases using distributed line flow computing according to the present disclosure are provided.

FIG. 12 is a graph of power flow ($P_{phys}$-$P_f$) versus iterations for a simulation of the simple mesh power network of FIG. 9. Two example cases using distributed line flow computing according to the present disclosure provided.

In order to show feasibility of the proposed method in a larger system, consider an IEEE fourteen bus test system. FIG. 13 is a representation of the system with lines as branches 1 through 20 and buses as nodes N1 through N14 of a graph. In particular, FIG. 13 is a line diagram of an Institute of Electrical and Electronics Engineers (IEEE) fourteen bus system that can be monitored via the distributed line flow computing method and system of the present disclosure. A normal tree is represented by solid black lines, wherein the solid black lines further represent δ values, which would be updated independently in the algorithm, according to equation (22). The direction of the line flow is taken to always flow towards the bus with a higher index number, which in this case is also an element number of a node. The A matrix can be created by using the bus and branch data of the system, and the injections, b, are given as the generation or load values in the data. In the interest of space, the actual matrix A and vector b are not shown.

The simulation lasted 23 iterations, in the system which had 14 buses and 20 branches. Out of the 20 branches, 13 branches have independent phase angle difference values, and were chosen based on the normal tree shown in FIG. 13. The last 7 branches, indicated in dashed lines, have their phase angles updated according to KVL. For example, $\delta_5$ would be constrained by $\delta_5 - \delta_2 + \delta_1 = 0$.

The iterations of $P_f$ and $P_{phys}$ are shown in FIGS. 14 and 15. They are shown to settle to some value, which is the final answer when the algorithm converges. The difference between $P_f$ and $P_{phys}$ in FIG. 16 is shown to go to zero, which is the desired result, shows that the algorithm has converged.

FIG. 14 a graph of power flow ($P_f$) that satisfies Kirchhoff's current law (KCL) versus iterations for a simulation of the IEEE fourteen bus system of FIG. 13 using distributed line flow computing according to the present disclosure.

FIG. 15 is a graph of power flow ($P_{phys}$) that satisfies Kirchhoff's voltage law (KVL) and Ohm's law versus iterations for a simulation of the IEEE fourteen bus system of FIG. 13 for two example cases using distributed line flow computing according to the present disclosure.

FIG. 16 is a graph of power flow ($P_{phys}$-$P_f$) versus iterations for a simulation of the IEEE fourteen bus system of FIG. 13 for two example cases using distributed line flow computing according to the present disclosure. The solution was checked with a simultaneous equation solver, which represents the centralized solution of the power flow. The results are shown in Table VII. The difference between the two solutions is around 0.02 p.u. for the power flows within each of the lines.

TABLE 7

$P_f$ SOLUTIONS OF THE IEEE FOURTEEN BUS SYSTEM
Centralized Versus Distributed Solution

| Line No. | $P_{fCentr.}$ | $P_{fDistr.}$ |
| --- | --- | --- |
| 1 | 1.4889 | 1.4705 |
| 2 | 0.7408 | 0.7285 |
| 3 | 0.7246 | 0.7115 |
| 4 | 0.5467 | 0.5395 |
| 5 | 0.4047 | 0.3957 |
| 6 | −0.2285 | −0.2217 |
| 7 | −0.6260 | −0.6331 |
| 8 | 0.2907 | 0.3031 |

TABLE 7-continued $P_f$ SOLUTIONS OF THE IEEE FOURTEEN BUS SYSTEM
Centralized Versus Distributed Solution

| Line No. | $P_{fCentr.}$ | $P_{fDistr.}$ |
| --- | --- | --- |
| 9 | 0.1666 | 0.1727 |
| 10 | 0.4196 | 0.4349 |
| 11 | 0.0634 | 0.0650 |
| 12 | 0.0732 | 0.0752 |
| 13 | 0.1728 | 0.1752 |
| 14 | 0.0000 | 0.0014 |
| 15 | 0.2907 | 0.2975 |
| 16 | 0.0619 | 0.0658 |
| 17 | 0.1014 | 0.1028 |
| 18 | −0.0281 | −0.0272 |
| 19 | 0.0119 | 0.0116 |
| 20 | 0.0487 | 0.0482 |

The results show in Table 7 show that the method of the present disclosure yields accurate power flow calculations for a nontrivial system. The meshed nature of the IEEE fourteen bus system of FIG. 13 is also accounted for, by creating algebraic constraints for the phase angle variables of the system. The number of iterations used to solve the IEEE fourteen bus system is around five times greater than the number of iterations required for the three bus system of FIG. 9.

FIG. 17 is a block diagram of a line flow calculator 22 for executing the distributed line flow computing method in accordance with the present disclosure. The line flow calculator 22 includes a central processing unit (CPU) 24 for executing software and/or firmware 28 stored in a memory 26 wherein the software and/or firmware has a code that is executable by the CPU 24 to realize the distributed line flow computing method of the present disclosure. The line flow calculator 22 also includes a data memory 30 that serves as a buffer for a communications interface 32 that passes data to and from the data memory 30. The communications interface 32 controls an input/output (I/O) port 34 and a wireless transceiver 36 and an antenna 38 that is usable to transmit data to and receive data from other line flow calculators such as the line low calculator 22. The I/O port 34 may be coupled to sensors 40 and power control electronics 42. Either the I/O port 34 or the wireless transceiver 36 is adaptable to interface with a computer network 44 that provides communication with a centralized supervisor 46.

The line flow calculator 22 may be integrated with the sensors 40 and integrated into a dynamic line rating (DLR) device that uses the sensors 40 to determine the maximum current carrying capacity of a transmission line for an electrical utility. In particular, the sensors 40 are adapted to monitor ambient weather conditions such as temperature, wind speed, and wind direction along with solar radiation local to the transmission line. The sensors 40 may also include train-gauge tension sensors that are usable to monitor transmission line sag to insure that the transmission line to ground clearance thresholds are not violated.

The line flow calculator 22 may be further integrated with the power control electronics 42 to comprise a flexible AC transmission system (FACTS) device that improves power transmission efficiency. The line flow calculators 22 are adaptable to provide data to the FACTS devices that is usable by the FACTS devices to control power injections into the nodes of a network in order to increase the efficiency of power transmission. However, it is to be understood that the line flow calculator 22 is operable as a separate device that communicates with external DLRs and FACTS. Moreover, while the line flow calculator 22 are adaptable to optionally communicate over the computer network 44 with the centralized supervisor 46, the line flow calculator 22 operates locally to calculate line flows without needing to communicate with the centralized supervisor 46. A primary use of the optional communication between the line flow calculator 22 and the centralized supervisor 46 is to automatically report line flow calculations that fall outside predetermined limits.

FIG. 18 is a simplified diagram of an electrical utility network 48 that incorporates line flow calculators 22A, 22B, and 22C that are usable to implement the distributed line flow computing method and system of the present disclosure. The electrical utility network 48 includes nodes 50A, 50B, and 50C. A plug-in hybrid electric vehicle (PHEV) 52 and a wind farm electrical generator 54 are coupled to the node 50A. The line flow calculator 22A accounts for the presence of the PHEV 52 and the wind farm electrical generator 54 using physical data that represents the operating characteristics of the PHEV 52 and the wind farm electrical generator 54. The physical data can be, but is not limited, to resistance, inductance, and capacitance. The data can also be dynamic measurements of reactive power and real power that are stored, delivered by the wind farm electrical generator 54 and absorbed and stored by the PHEV 52. The line flow calculator 22A shares the physical data from the node 50A with the line flow calculators 22B, and 22C.

A traditional electric power plant 60 is coupled to the node 50B. Physical data associated with the traditional electric power plant 60 is used by the line flow calculator 22B coupled to the node 50B to at least partially calculate the line flow for a transmission line 56A that is held above ground by transmission line towers 58A. The line flow calculator 22B communicates with the line flow calculator 22A to distribute data and portions of the line flow calculation for the transmission line 56A.

A transmission line 56B couples the node 50B to the node 50C and is held above ground by transmission line towers 58B. A photovoltaic array 62 of utility scale is coupled to the node 50C along with commercial and residential loads 64. The line flow calculator 22B communicates with the line flow calculator 22C to share data associated with the tradition electrical power plant 60, the photovoltaic array 62, and the commercial and residential loads 64 as well as distribute partial calculations to calculate a line flow for the transmission line 56B.

Similarly, a transmission line 56C couples the node 50A to the node 50C and is held above the ground by transmission line towers 58C. The line flow calculator 22C communicates with the line flow calculator 22A to share data associated with the photovoltaic array 62, and the commercial and residential loads 64, the PHEV 52, and the wind farm electrical generator 54 as well as distribute partial calculations to calculate a line flow for the transmission line 56B. In at least one embodiment, the distributed partial calculations can be in the form of a distributed Hessian matrix such as the Hessian matrix, $\nabla^2 f$ ($P_f$). The distributed partial calculations are preferably communicated via the wireless transceiver 36 (FIG. 17) of the line flow calculators 22A, 22B, and 22C.

FIG. 19 is a flow chart illustrating the general operation of the distributed line flow computing method of the present disclosure. In this case, a variable x represents branch line flows of an objective function to be optimized, a variable y represents nodal outputs quantities, and the variable z represents quantities relevant to components coupled to the nodes. A variable k represents an iterator used to iterate through matrices that include the variables x, y, and z. The objective function can be written as a summation of subfunctions, each of which can be written as a function of only one variable.

The flow computing method receives the objective function and initializes the variables x, y, and z (step 100). The variable x is updated via the objective function and the initialized variables x, y, and z using the distributed Newton method (step 102). In an electrical energy system, such as the electrical utility network 48 (FIG. 18) the step 102 uses KCL to account for physical constraints.

Values for the nodal output variables y and the component variables z are calculated using values calculated for the updated variable x (step 104). In an electrical energy system, such as the electrical utility network 48 (FIG. 18), the step 104 uses KVL and Ohm's law to account for physical constraints.

The magnitudes of the component variables z, the nodal output variables y, and the branch flow variables x are checked for convergence within a predetermined threshold range (step 106). If convergence within a predetermined range occurs, the flow computing method is complete (step 108). Alternately, if the convergence falls outside the predetermined range, the integrator k is incremented (step 110). The step 102, step 104, and step 110 are repeated until convergence of the magnitudes of the component variables z, the nodal output variables y, and the branch flow variables x falls within a predetermined range.

It is to be understood that the flow computing method of the present disclosure updates variables x, y, and z is calculated for different locations with the electrical energy system, such as the electrical utility network 48 (FIG. 18). Moreover, the calculations are typically performed at different times. In this way, calculations for the variables x, y, and z are distributed throughout the electrical energy system such as the electrical utility network 48 (FIG. 18). Moreover, the flow computing method can be used to calculate the branch flow variables x for mini electrical grids such as those proposed for shopping centers and the like. Further still, it is to be understood that the flow computing method of the present disclosure is applicable to networks other than the electrical energy systems. Such networks include, but are not limited to, transportation networks, hydrological networks, and communications networks.

In accordance with the present disclosure, at least one embodiment of the above described method comprises computer instructions stored on a computer readable medium. Examples of computer readable mediums include but are not limited to, a random access memory (RAM), a read-only memory (ROM), a magnetic disk, a flash memory stick, a flash memory card, a digital versatile disk (DVD), and compact disk read-only memory (CDROM).

To illustrate the potential of this distributed power flow calculator for online contingency screening, consider again the simple three bus mesh network, shown in FIG. 9. Moreover, it is assumed that this network is in normal condition when all three lines are connected in the system. The results of the online calculation of the network condition are shown in Table 4, Table 5, and Table 6. Consider next, that line three is disconnected due to some fault. The embedded intelligence will then see this network as a simple three bus radial network, shown in FIG. 9. The algorithm will in this case, show results similar to the results in Table 4, Table 5, and Table 6. Using data transmitted from adjacent line flow calculators, the components of the network will recognize topology changes and the results of the algorithm will account for these changes. This procedure sets the basis for a distributed and automated contingency screening by the line flow calculators themselves. They could compare the computed flows to their thermal limits and send alerts to the centralized supervisor 46 (FIG. 17) as the flows are about to exceed these limits. Notably, these alerts can be created in a complete distributed way by lines interacting with neighboring nodes and lines.

The method and system of the present disclosure specifically solves the lossless decoupled real power flow problem in a distributed way with respect to transmission lines and with communications between lines and buses. An extension to the disclosed method and system is adaptable to a fully coupled, lossy, AC power flow.

One way to extend this work is to formulate optimization problems instead of simply power flow problems. This could lead to the incorporation of optimizing the settings of controllers on the network, such as FACTS devices, for adjusting line flows, as well as DLR units, to access a line's thermal limits. Another extension of the disclosed method and system adapts from decoupled real power to AC coupled power flow.

In a broader sense, the disclosed method and system provides a qualitatively different approach to computing power line flows by embedding line flow calculators which communicate with neighboring line flow calculators associated with adjacent lines and nodes. Moreover, the disclosed method and system is adaptable to enhance modern centralized contingency screening and power flow computations. Further still, the disclosed method and system is adaptable to provide a major fail-safe mechanism based on distributed local computations and communications for a case in which coordinated computing and communications fail to function.

Yet another use of the embodiments of this disclosure is that it provides a novel solution to an old problem of power flow calculations in large electric grids. Instead of relying on centralized information and calculations in utility control centers, the disclosed method enables parallel distributed computing by a distributed line flow calculator of each branch. Only information exchange with the nodes and branches directly to the line flow calculator is needed. As such, the method of the disclosure allows for the enabling of distributed micro-grids with embedded line flow calculators in their branches, which exchange information and autonomously compute their own equilibrium. Thus, the implications of the present disclosure on wide-spread distributed management of future electric power grids are far reaching. Moreover, the disclosure also supports parallel distributed computing of equilibria in any electrical network by incorporating line flow calculators embedded into the electrical network's branches while relying only on local information exchange between the line flow calculators.

Those skilled in the art will recognize improvements and modifications to the preferred embodiments of the present disclosure. All such improvements and modifications are considered within the scope of the concepts disclosed herein and the claims that follow.

What is claimed is:

1. A computerized method for distributed line flow computing for a network having line flow calculators, each of which include a communications interface, a central processing unit, and a memory for executing the computerized method and nodes with branches coupling adjacent ones of the nodes and components coupled to the nodes, the method comprising:

receiving via the line flow calculators an objective function configured to minimize differences between first line flows that are determined using a first relationship of the objective function and second line flows that are determined using at least a second relationship of the objective function, the objective function having component variables, nodal output variables and branch flow variables for the network;

initializing via the line flow calculators the component variables, nodal output variables and branch flow variables with initial values; and calculating via the line flow calculators values for the branch flow variables using a distributed Newton method, and calculating values for the component variables and the nodal output variables using values calculated for the branch flow variables until the values of the component variables, the nodal output variables, and the branch flow variables converge within a predetermined threshold range.

2. The computerized method of claim 1 wherein the network is an electrical network.

3. The computerized method of claim 1 wherein the objective function is a summation of subfunctions, each of which is a function of only one of the component variables, the nodal output variables and the branch flow variables.

4. The computerized method of claim 2 wherein calculating values for the branch flow variables using the distributed Newton method includes the first relationship comprising Kirchhoff's current law (KCL) calculations.

5. The computerized method of claim 2 wherein calculating values for the component variables and the nodal output variables using values calculated for the branch flow variables includes the at least the second relationship comprising Kirchhoff's voltage law (KVL) calculations and Ohm's law calculations.

6. The computerized method of claim 2 wherein calculating values for the branch flow variables using the distributed Newton method accounts for losses in the branches.

7. The computerized method of claim 2 wherein the line flow calculators are communicatively coupled to exchange data about adjacent branches and adjacent nodes.

8. The computerized method of claim 2 wherein the line flow calculators are communicatively coupled to dynamic line rating (DLR) units that provide line rating data to the line flow calculators.

9. The computerized method of claim 2 wherein the line flow calculators are communicatively coupled to flexible AC transmission systems (FACTS) devices that receive data from the line flow calculators to adjust power injections into the nodes to increase power transmission efficiency.

10. A non-transitory computer readable medium storing computer executable instructions for a line flow calculator having a central processing unit and memory for executing the computer executable instructions, comprising:

code for receiving an objective function configured to minimize differences between first line flows that are determined using a first relationship of the objective function and second line flows that are determined using at least a second relationship of the objective function, the objective function having component variables, nodal output variables and branch flow variables for the network;

code for initializing the component variables, nodal output variables and branch flow variables with initial values; and code for calculating values for the branch flow variables using a distributed Newton method, and calculating values for the component variables and the nodal output variables using values calculated for the branch flow variables until the values of the component variables, the nodal output variables, and the branch flow variables converge within a predetermined threshold range.

11. The non-transitory computer readable medium of claim 10 wherein the network is an electrical network.

12. The non-transitory computer readable medium of claim 10 wherein the objective function is a summation of subfunctions, each of which is a function of only one of the component variables, the nodal output variables and the branch flow variables.

13. The non-transitory computer readable medium of claim 11 wherein calculating values for the branch flow variables using the distributed Newton method includes the first relationship comprising Kirchhoff's current law (KCL) calculations.

14. The non-transitory computer readable medium of claim 11 wherein calculating values for the component variables and the nodal output variables using values calculated for the branch flow variables includes the at least the second relationship comprising Kirchhoff's voltage law (KVL) calculations and Ohm's law calculations.

15. The non-transitory computer readable medium of claim 11 wherein calculating values for the branch flow variables using a distributed Newton method accounts for losses in the branches.

16. The non-transitory computer readable medium of claim 11 wherein the line flow calculators are communicatively coupled to exchange data about adjacent branches and nodes.

17. The non-transitory computer readable medium of claim 11 wherein the line flow calculators are communicatively coupled to dynamic line rating (DLR) units that provide line rating data to the line flow calculators.

18. The non-transitory computer readable medium of claim 17 further including code that is executable to receive thermal line limits from the DLR units and compare computed line flows with the thermal line limits reported by the DLR units to alert a centralized supervisor if a thermal limit is exceeded.

19. The non-transitory computer readable medium of claim 11 wherein the line flow calculators are communicatively coupled to flexible AC transmission systems (FACTS) devices that receive data from the line flow calculators to adjust power injections into the nodes to increase power transmission efficiency.

20. A system including distributed line flow computing, the system comprising:
  a network having components coupled to nodes that are coupled by branches;
  line flow calculators associated with each of the nodes and each of the branches, each of the line flow calculators comprising:
    a communications interface for communicating with other line flow calculators;
    a central processing unit (CPU) for controlling the communications interface; and
    a memory for storing software and/or firmware that is executable by the CPU wherein the software and/or firmware comprises:
      code for receiving an objective function configured to minimize differences between first line flows that are determined using a first relationship of the objective function and second line flows that are determined using at least a second relationship of the objective function, the objective function having component variables, nodal output variables and branch flow variables for the network;
      code for initializing the component variables, nodal output variables and branch flow variables with initial values;
      code for calculating values for the branch flow variables using a distributed Newton method, and calculating values for the component variables and the nodal output variables using values calculated for the branch flow variables until the values of the component variables, the nodal output variables, and the branch flow variables converge within a predetermined threshold range; and
      code for transmitting and receiving partial line flow calculations to and from adjacent line flow calculators.

21. The system of claim 20 wherein a Hessian matrix, $\nabla^2 f(P_f)$ is distributed among the line flow calculators wherein $P_f$ represents power flow through the branches.

22. The system of claim 20 wherein the network is an electrical network.

23. The system of claim 20 wherein the objective function is a summation of subfunctions, each of which is a function of only one of the component variables, the nodal output variables and the branch flow variables.

24. The system of claim 22 wherein calculating values for the branch flow variables using the distributed Newton method includes the first relationship comprising Kirchhoff's current law (KCL) calculations.

25. The system of claim 22 wherein calculating values for the component variables and the nodal output variables using values calculated for the branch flow variables includes the at least the second relationship comprising Kirchhoff's voltage law (KVL) calculations and Ohm's law calculations.

26. The system of claim 22 wherein calculating values for the branch flow variables using a distributed Newton method accounts for losses in the branches.

27. The system of claim 22 wherein the line flow calculators are communicatively coupled to exchange data about adjacent branches and adjacent nodes.

28. The system of claim 22 wherein the line flow calculators are communicatively coupled to dynamic line rating (DLR) units that provide line rating data to the line flow calculators.

29. The system of claim 22 wherein the line flow calculators are communicatively coupled to flexible AC transmission systems (FACTS) devices that receive data from the line flow calculators to adjust power injections into the nodes to increase power transmission efficiency.

* * * * *

UNITED STATES PATENT AND TRADEMARK OFFICE
CERTIFICATE OF CORRECTION

PATENT NO. : 9,054,531 B2
APPLICATION NO. : 13/343997
DATED : June 9, 2015
INVENTOR(S) : Marija D. Ilic and Andrew Hsu It is certified that error appears in the above-identified patent and that said Letters Patent is hereby corrected as shown below:

In the Specification:

In column 2, line 6, replace "vector 8" with --vector $\theta$--.

In column 2, Equation (3), replace the double prime with a single prime so as to read as follows:

$$P_f = DAB^{r-1} P_g$$

In column 5, Equation (10), replace "$P_{f,k+}1=P_{fk}+v_k$" with --$P_{f,k+1}=P_{fk}+v_k$--.

In column 6, line 4, replace "Wk" with --$w_k$--.

In column 6, line 5, replace "$P_{fk+1}=P_{fk}\pm v_k$" with --$P_{fk+1}=P_{fk}+v_k$--.

Signed and Sealed this
Twentieth Day of October, 2015

Michelle K. Lee
*Director of the United States Patent and Trademark Office*